Aug. 11, 1964  H. G. ABBEY  3,143,975
CANTILEVERED WORK CARRIERS FOR CONVEYOR SYSTEMS
Filed Sept. 5, 1962  3 Sheets-Sheet 1

INVENTOR.
HAROLD G. ABBEY
BY
ATTORNEY

3,143,975
CANTILEVERED WORK CARRIERS FOR CONVEYOR SYSTEMS
Harold G. Abbey, 189—10 Aberdeen Road, Jamaica 23, N.Y.
Filed Sept. 5, 1962, Ser. No. 221,473
8 Claims. (Cl. 104—128)

This invention relates generally to conveyor systems in which work carriers are conveyed along a trackway to a series of operating stations, and more particularly to a system in which the loads are suspended from cantilever arms extending from carrier trolleys riding along the trackway in order effectively to isolate the loads from the conveyor system and to obtain other practical advantages.

This application is a continuation-in-part of my pending application entitled "Key Card Dispatched Conveyor Systems," Serial No. 114,583, filed April 18, 1961.

In my Patents Nos. 2,854,159, 2,987,201, 2,975,882 and 2,979,181, there are disclosed conveyor structures including a plurality of work carriers movable on an overhead track for travel to various work stations therebelow, the track being provided with removable rail segments vertically aligned with the stations. Individual elevators are provided for the removable segments, the work carrier being supported on the rail segment as it is lowered by the associated elevator to a work station. Acting in conjunction with each removable segment is a substitute segment which automatically replaces the removable segment when it is lowered, thereby re-establishing the continuity of the track and permitting uninterrupted passage of carriers.

The removable and substitute segments are so arranged that the action of lowering a removable segment to a point below the track at the same time also causes the admittance of a substitute segment into the track position. Thus no gaps are permitted to remain in the track and the flow of traffic thereon is maintained. This makes possible a leap-frog operation in which, as one carrier occupies a down or work position, the next carrier bypasses the occupied station to continue its travel to an assigned station.

The arrangement is such that each elevator and its associated removable and substitute segments constitute a module, and various arrangements are possible by combining such modules.

The load-carrying trolleys or carriers run on a single or double beam track and are propelled to power pushers which are not permanently connected to the carriers, hence the carriers can be switched at will from a main conveyor line onto spur or secondary lines, all in the horizontal plane, or lowered vertically to processing or work stations below the track without interrupting the flow of main line traffic. Such power-and-free conveyors have many advantages in manufacturing and processing operations over arrangements in which the power drive is permanently coupled to the carriers, for the carriers need not be unloaded from start to finish of the operations.

In the load-carrying trolley arrangement disclosed in the above-identified patents, the load is suspended directly below the trolley and is lowered by the associated elevator to a work station which in practice may be a liquid plating bath. The material to be plated in some instances is contained within a rotating barrel. The up-and-down movement of the barrel as well as its rotation and the resultant agitation of the liquid in the bath, tends to cause dripping, splattering and splashing. Where the liquid is an acid and makes contact with components of the conveyor system its effects are obviously destructive.

Another drawback of the prior arrangement for the suspension of work loads is that it does not lend itself to sealing-off operations where, for example, it is necessary to manipulate the work loads within a purified or protective atmosphere isolated from the main body of the conveyor system.

One important mechanical disadvantage of the prior arrangement is that since the work loads are suspended directly below the trolleys in the conveyor system and the trolleys are intended to leap-frog one over the other, the headroom requirements for this operation are relatively great.

Accordingly, it is the principal object of this invention to obviate the above-noted drawbacks and to provide a cantilever arrangement for suspending loads from a carrier whereby the carrier or trolley is mechanically stabilized on the trackway and the path of work is displaced laterally from the conveyor mechanism. A significant advantage of this arrangement is that it prevents contamination of the mechanism by liquid drip and it also allows for variable size loads with standardized modular conveying elements.

Still another object of the invention is to provide a cantilever arrangement of the above-noted type making possible reduced headroom requirements for leap-frogging operations.

Also an object of the invention is to provide a conveyor system having cantilevered work carriers for conveying work within an isolation chamber having a protected atmosphere, without in any way impairing the flexibility of the conveyor system or its ability to carry out leap-frog or other operations.

Briefly stated, these objects are accomplished in a conveyor system wherein movable along a trackway having upper and lower flanges, are trolleys provided with wheels riding between the flanges on either side of a vertical separator therebetween. Extending laterally from one side of the trolley is a cantilever arm from which work loads are suspended eccentrically from the trolley, thereby displacing the loads from the trackway and applying a torque to the trolley causing the wheels on the other side thereof to engage the upper flange, while the wheels on the same side engage the lower flange. In this way a play-free movement of the trolley along the trackway is obtained and the trolley position is stabilized.

For a better understanding of the invention, as well as other objects and further features thereof, reference is made to the following description to be read in conjunction with the annexed drawings wherein like components in the several views are identified by like reference numerals.

In the drawings:

FIG. 5 is a sketch indicating how the work loads are adapted to operate within an isolation chamber, the chamber being shown in end view; and FIG. 6 is a front view of the isolation chamber.

Figure 1:
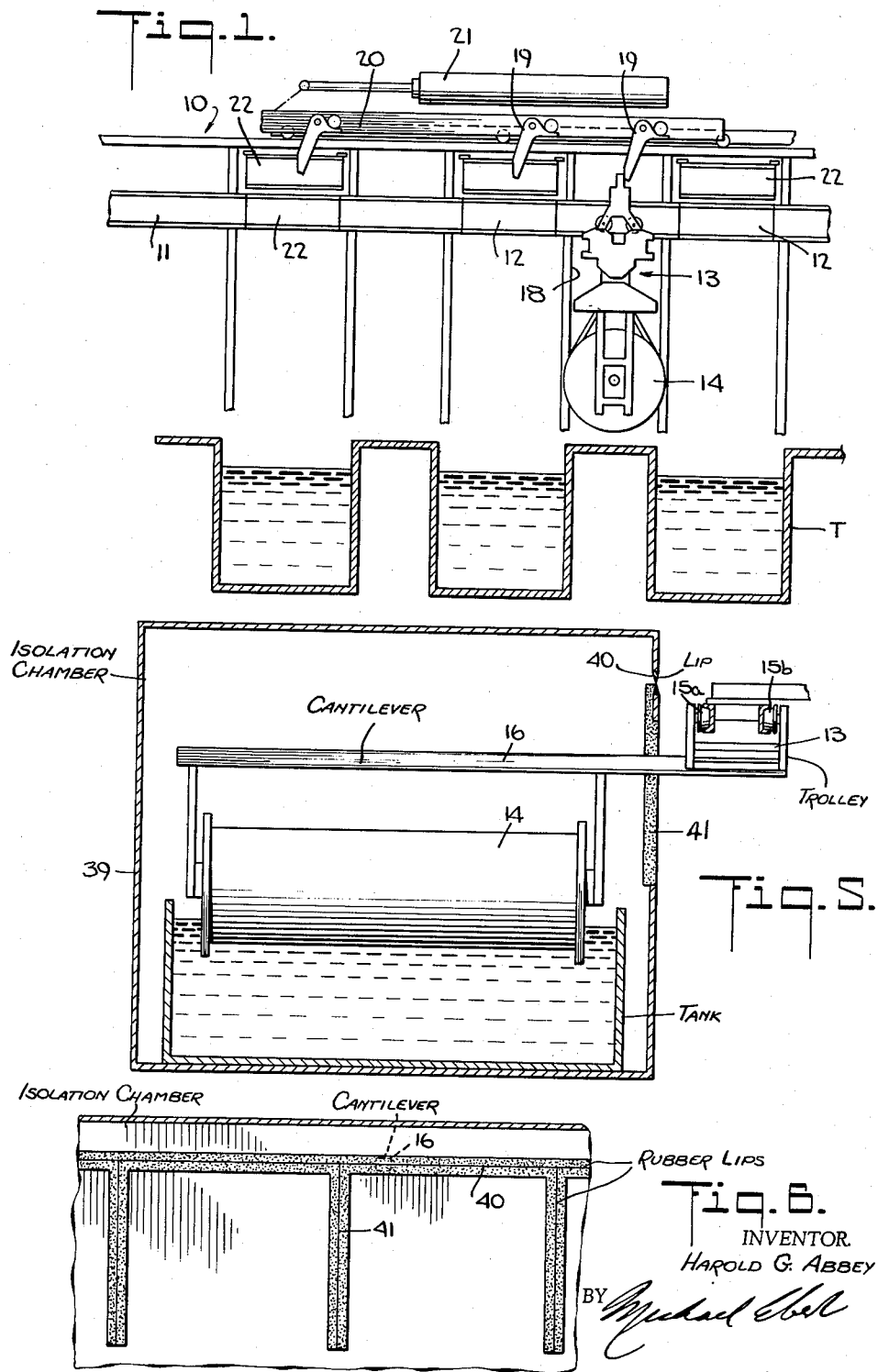
FIG. 1 is a schematic view in front elevation showing a small portion of a conveyor system in accordance with the invention.
Figure 2:
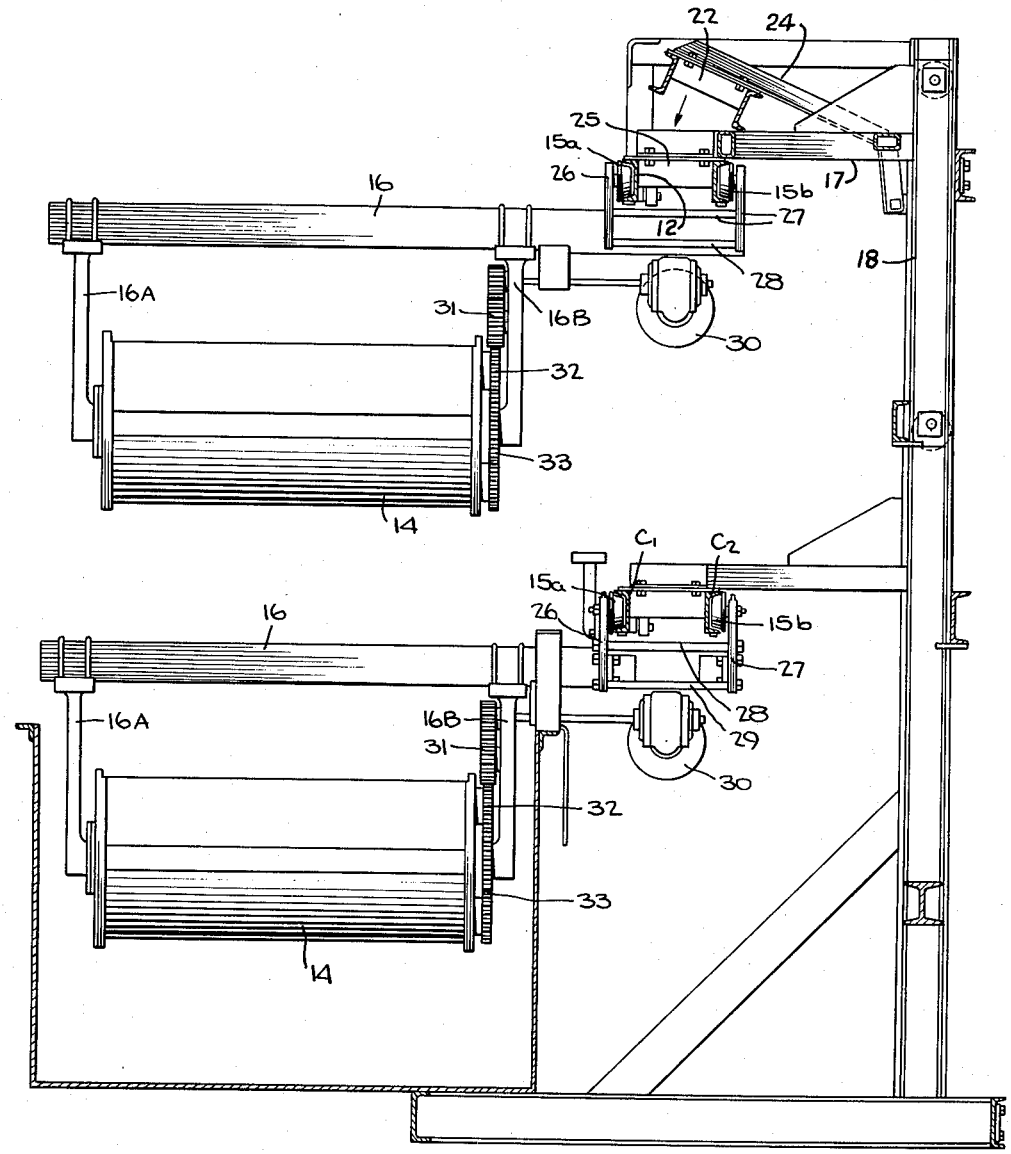
FIG. 2 is a side view showing a single trolley on a removable segment of the trackway, the trolley having a cantilever arm from which is suspended a load in the form of a rotating barrel, the same trolley being shown both on the trackway and lowered therefrom into a processing bath.

FIGS. 1 and 2 show only a small section of an overhead conveyor and processing system. In practice, the complete system may take the form of a continuous oval trackway having a large number of stations for carrying out various operations such as chemical cleaning, plating, rinsing, drying, etc. The arrangement may be such that any of the work carriers is made to undergo any desired sequence of operations independently of the operating cycles of the other carriers in the system.

Some of the many possible system arrangements and working applications therefor are disclosed in the above-identified Abbey patents and in said co-pending application Serial No. 114,583, as well as in the A.P.A. Bulletin 101 published by Abbey Process Automation, Inc., of Long Island City, New York, the magazine "Design News" for June 9, 1958, and the issue of "Automation" magazine for December, 1958.

As shown in FIGS. 1 and 2, the overhead, horizontally extending track 10 is constituted by a fixedly supported beam 11 and includes transfer rail segments 12 which normally lie in linear registration with the trackway but are removable therefrom. The rail segments 12 are in vertical alignment with the work stations therebelow.

Travelling along the track are a plurality of work carriers 13 which may support perforated cylindrical plating barrels 14 of non-conductive material, such as hard rubber, Lucite or melamine, or plating racks. The conveyor may be used in conjunction with all types of cellular liquid treatment. For non-electrolytic treatments, metal cylinders may be used in place of the non-metallic barrels.

Carrier or trolley 13 is in the form of a trolley having two sets of wheels 15A and 15B which ride on either side of the trackway rail to transport the barrel to selected stations. While a wheeled trolley is shown herein, this is only necessary for heavy-duty operations. It is to be understood that slide-type trolleys may be used on light-duty work.

The barrel loads, as best seen in FIG. 2, are suspended eccentrically by a cantilever arm 16 from the trolley 13. This cantilever suspension, which will be described in greater detail hereinafter, acts to stabilize the trolley position for accurate, play-free horizontal movement. The cantilever arrangement also allows for variable size work loads with standardized modular conveying elements, reduced headroom requirements for leap-frogging, and displacement of the carrier conveyor and control mechanisms from the path of work, thereby obviating the liquid drip and contamination of the mechanisms.

Each transfer rail segment 12 is movable downwardly by means of an individual elevator 17 riding on vertical frame beams 18. The transfer segment 12 is mechanically attached to the frame of elevator 17 so that when the elevator chain or cable is driven, the segment may be lowered or raised thereby, depending on the direction of drive. When the rail segment is lowered with a work carrier thereon, the plating barrel is immersed in a processing tank at the work station.

The trolleys 13 of the several work carriers are indexed or shifted in a stepwise manner along the trackway in one direction by means of spaced pusher fingers 19 which are pivotally connected to a reciprocally-operated actuator bar 20, disposed above the rail and parallel thereto. The bar 20 is slidably supported and is driven in alternate directions at timed intervals by a suitable hydraulic device 21 or other means. For each forward stroke of the bar, the pusher finger 19 advances trolley 13 from one station to the next. Stops in the form of pivotal dogs or spring-actuated detents (to be later described) may be used for holding a carrier on a rail segment 12 or on a main track 11 to prevent displacement.

Pivotally supported above each transfer rail segment is a substitute rail segment 22 which is an exact duplicate of segment 12. The arrangement is such that when the transfer segment 12 is lowered by elevator 17, the matching substitute segment 22 falls downwardly in place of the transfer segment so that no break exists in the continuity of the trackway and successive work carriers are able to proceed without interruption and skip over any work carrier which has been lowered into a work station. Thus the withdrawal of one or more work carriers from the trackway does not act to delay the transfer of other carriers.

The elevator may be individually motor driven or operated by an automatic clutch mechanism (not shown) from a master shaft (not shown). Alternatively, the elevators may be individually motor operated, or piston-operated by air or hydraulic pressure. In any case, down and up control may be effected by an adjustable time switch (not shown) for the motor or clutch, or by an adjustable motor timer, valve or cam for air or oil. The elevation of a carrier while another is passing over can be prevented by an electrical lockout (not shown) for the motor, a mechanical or electrical lockout for the clutch or a valve lockout (not shown) for the air or oil supply. In this connection, reference is made to Abbey Patent No. 2,854,159.

While the stations have been shown with uniform spacing therebetween, it will be appreciated that the spacing may be varied as desired and the elevator spacing adjusted accordingly. Elevator stations can be separated by long sections of fixed track with a continuous chain or cable conveying motion to the next station for pick-up by the reciprocating transfer. Any configuration of a complete cycle can be arranged as long as the loop is closed for the return of the carriers.

Referring again to FIG. 2 and to the upper section of this figure, it will be seen that trolley 13 is positioned on a removable track segment 12 and that the substitute segment 22 is raised thereabove, the substitute segment being mounted on a pivoted arm 24. The trackway including the removable and substitute segments is formed by a pair of channel members $C_1$ and $C_2$, held in spaced parallel positions by spacer plates 25, the channel members having upper and lower flanges.

The trolley is constituted by a pair of vertical end plates 26 and 27 held together by cross bars 28 and 29, one set of wheels 15A being rotatably mounted on outer plate 26 and the other set on inner plate 27. The cantilever arm 16 is secured to plates 26 and 27 and extends outwardly from the outer plate 26.

Wheels 15A ride within channel member $C_1$ and wheels 15B within channel member $C_2$. The torque produced by the weight of the barrel suspended from the cantilever arm acts to force wheels 15B into engagement with the upper flange of channel member $C_2$, whereas wheels 15A are brought into engagement with the lower flange of channel member $C_1$. Thus while the diameter of the wheels is smaller than the channel passage, the arrangement is such as to eliminate any play or rocking of the trolley when in motion, for the load acts to stabilize its position on the trackway.

The barrel 14 is suspended from the cantilever arm by means of a pair of standards 16A and 16B which are coupled to the arm and extend downwardly therefrom, the standards being provided with bearings for rotatably supporting the barrel. The barrel is driven by a motor 30, suspended directly below the trolley and operatively coupled to the barrel by means of a conventional gear reduction box and a gear train composed of gears 31, 32 and 33.

When the removable segment on which the trolley is placed is lowered by the elevator, the barrel containing the work is received within the processing tank T, as shown in the lower portion of FIG. 2.

Figure 3:
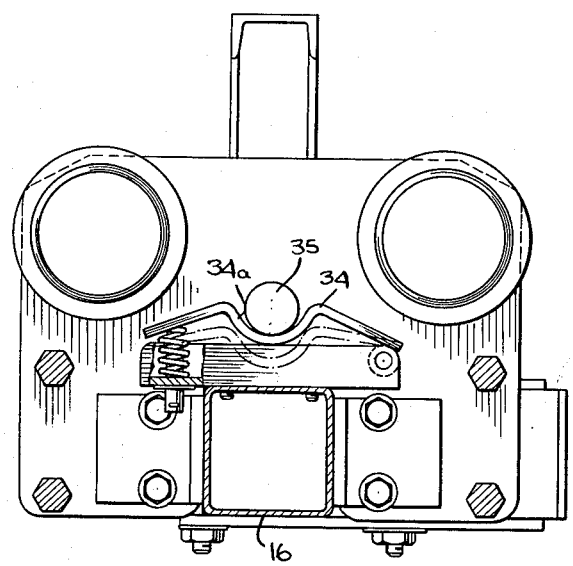
FIG. 3 is a plan view of one of the end plates of the trolley, and illustrates the detent mechanism for holding the trolley in position on the removable track segment.

When the trolley is advanced into a track segment at an operating station, it is important that the trolley maintain its exact center position on the segment and not shift position until it is to be advanced to the next station. This is accomplished by a detent mechanism, as shown in FIG. 3, taking the form of a spring-loaded shoe 34 which is curved to define a recess 34a for receiving a friction pin 35 fixed to the trackway segment. The spring tension against the pin is sufficient to hold the trolley in place until the next pusher action.

Figure 4:
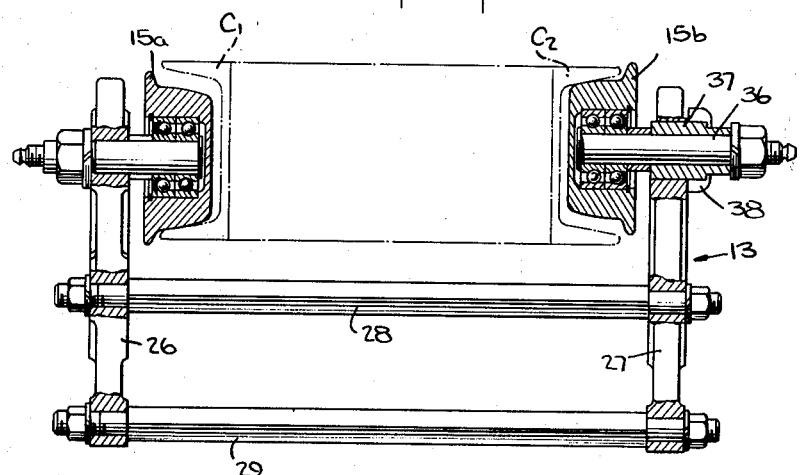
FIG. 4 is a sectional view taken through the trolley wheels to illustrate the adjusting means therefor.

Each trolley wheel, as shown in FIG. 4, is ball-bearing mounted on a shaft 36 passing through an eccentric bushing 37 whose angular position is held by a jam nut 38, the bushing extending through the trolley plate. The position of the wheel relative to the channel member flanges may be readily adjusted by turning the eccentric bushing to elevate or lower the wheel as desired.

Referring now to FIGS. 5 and 6, there is schematically shown an arrangement effectively isolating the barrels from the conveyor mechanism. For this purpose a series of processing tanks is enclosed in an elongated chamber 39 which is completely enclosed except for a horizontally-extending continuous flexible lip 40. This lip is formed on the side wall of the chamber and parallel to the trackway at a height corresponding to the cantiliver arm position when the trolley is fully elevated. At spaced vertical lines along the side wall corresponding to the elevator positions along which the cantilever arm is lowered and raised, are vertical lip branches 41 which join the main lip line.

The various cantilever arms extending from the trolleys pass through the lips into the chamber, and the lips, which may be made of a suitable rubber or flexible plastic, close about these arms to seal off the chamber. The lips only part temporarily as the arms are moved along the trackway or up and down by the elevators. In this way, a protective atmosphere may be maintained within the chamber, without interfering with the conveyor operation.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A conveyor structure comprising a track constituted by a pair of parallel channel members having horizontally extending lower and upper flanges, carriers movable along said track and provided with two sets of wheels each riding in a respective channel member, each carrier including a cantilever arm and means to suspend a work load on said arm at a position displaced outwardly from said track and to produce a torque causing one set of wheels to engage the upper flange of one member and the other set to engage the lower flange of the other member.

2. An automatic conveyor structure comprising a substantially horizontal overhead track, at least one trolley-supported work carrier suspended from said track, said track including at least one removable segment, an elevator for supporting said removable segment to said track and adapted bodily to withdraw said segment from said track and to lower same to a processing position thereby causing a gap to form in said track, a substitute segment, and means automatically inserting said substitute segment bodily in said track to replace the withdrawn removable segment and thereby to restore the continuity of said track, said track segments including a pair of spaced channel members having upper and lower flanges, said work carrier including wheels riding in said channel members, a cantilever arm extending laterally from said carrier and means to support a work load on said arm at a position displaced from said track to produce a torque causing the wheels in one of said channel members to engage the upper flange thereof and the wheels in the other channel member to engage the lower flange thereof.

3. A conveyor structure comprising a plurality of work carriers, an overhead track for conveying said carriers to various work stations disposed below said track, said track including removable rail segments vertically aligned with said stations and bodily removable from said track, separate elevator means operatively coupled to each of said removable segments to lower same to a respective work station therebelow, thereby leaving a gap in said track, and substitute rail segments normally disposed above said removable segments and adapted to be bodily shifted to replace said removable segments when lowered by said elevator means and thereby restore the continuity of said track, said track segments including a pair of spaced channel members having upper and lower flanges, said carriers including wheels riding in said members and a cantilever arm extending laterally therefrom, and means to suspend work loads from said arms at a position displaced from said track to produce a torque causing the wheels in one of said channel members to engage the upper flange thereof and the wheels in the other channel member to engage the lower flange thereof.

4. A trolley adapted to ride a trackway, constituted by a pair of spaced channel members having horizontally extending lower and upper flanges, said trolley comprising a pair of vertical mounting plates, two sets of wheels rotatably mounted on said plates to ride on said channel members, and a cantilever arm extending between said plates and projecting laterally from one plate to support a work load at a position displaced from said trackway to provide a torque causing one set of wheels to engage the upper flange of one member and the other set of wheels to engage the lower flange of the other member.

5. A trolley as set forth in claim 4, further including means to adjust the axial position of said wheels relative to said channel members in a direction effecting a change in the elevation of said cantilever arm.

6. A conveyor structure comprising a plurality of work carriers, an overhead track for conveying said carriers to various work stations disposed below said track at spaced positions, said track being constituted by a pair of spaced channel members having upper and lower flanges, said track including removable transfer rail segments vertically aligned with said stations, a separate elevator for supporting each transfer segment and adapted to lower same to a respective station for processing thereat, a substitute segment normally disposed above said transfer segment, means automatically inserting said substitute section in said track when said transfer section is removed therefrom to maintain the operative continuity of said track, means to shift each carrier stepwise from segment to segment on said track for successive alignment with said stations, and releasable stop means to center said carriers on said segments in the interval between said stepwise shifts, said carriers including wheels riding on said channel members and having a cantilever arm and means for supporting work loads at positions displaced from said track but in vertical alignment with said work stations to produce a torque causing the wheels in one of said channel members to engage the upper flange thereof and the wheels in the other channel member to engage the lower flange thereof.

7. A conveyor structure as set forth in claim 6, wherein said work load is constituted by a barrel mounted for rotation below said arm, and further including a motor for driving said barrel suspended below said carrier.

8. A conveyor structure as set forth in claim 6, wherein said work stations are enclosed in an isolation chamber having resilient lips through which said arms extend.

References Cited in the file of this patent

UNITED STATES PATENTS

| | | |
|---|---|---|
| 1,443,382 | Rapier | Jan. 30, 1922 |
| 1,446,463 | Hoffman | Feb. 27, 1923 |
| 1,701,013 | Ronk | Feb. 5, 1929 |
| 1,711,401 | Baldwin et al. | Apr. 30, 1929 |
| 1,731,691 | Webb | Oct. 15, 1929 |
| 1,787,604 | Throckmorton | Jan. 6, 1931 |
| 1,986,413 | Rumelin | Jan. 1, 1935 |
| 2,048,937 | Larson | July 18, 1936 |
| 2,390,293 | Colson | Dec. 4, 1945 |
| 2,394,168 | Goga | Feb. 5, 1946 |
| 2,602,558 | Clark | July 8, 1952 |
| 2,678,714 | Davis | May 18, 1954 |
| 2,854,159 | Abbey | Sept. 30, 1958 |
| 2,972,403 | Barton | Feb. 21, 1961 |
| 2,979,181 | Abbey | Apr. 11, 1961 |